United States Patent Office 3,706,731
Patented Dec. 19, 1972

3,706,731
PROCESS OF PREPARING HIGHLY SUBSTITUTED HYDROXYALKYL ETHERS OF UNINHIBITED GRANULE STARCHES SUBSTANTIALLY FREE OF SALTS AND GLYCOLS, AND RESULTING PRODUCTS
Erling T. Hjermstad, Cedar Rapids, Iowa, assignor to Keinep & Drof, Inc., Cedar Rapids, Iowa
No Drawing. Continuation-in-part of applications Ser. No. 779,631, Nov. 27, 1968, now abandoned, and Ser. No. 826,027, May 19, 1969, now Patent No. 3,577,407. This application May 3, 1971, Ser. No. 139,939
Int. Cl. C08b 19/06
U.S. Cl. 260—233.3 R
22 Claims

ABSTRACT OF THE DISCLOSURE

Substantially salt-free and glycol-free monofunctional reaction products of uninhibited granule starches with high levels of alkylene oxides are prepared by a water suspension etherification process using an alkaline catalyst in combination with an alkali metal sulfate. The alkali metal sulfate is essential, and it is used at a concentration of at least 3 to 5 parts per 100 parts of water. Although the reaction is carried to a high substitution level measured as hydroxyalkyl (D.S.), the starch, although not cross-linked, remains in native granule form and is both filterable and washable. This permits substantially complete removal of the salts and side reaction products by ordinary filtration and washing techniques. The method can be employed to produce novel starch products, which are believed to contain monofunctionally-linked oxyalkyl polymer chains, and the products are free of bifunctional cross-links.

CROSS-REFERENCE

This application is a continuation-in-part of co-pending application Ser. No. 779,631, filed Nov. 27, 1968, now abandoned, and of application Ser. No. 826,027, filed May 19, 1969, now Pat. No. 3,577,407.

BACKGROUND

In the United States starch industry, the process disclosed in Kesler and Hjermstad Pat. No. 2,516,633 has been used for many years to monofunctionally etherify starch with alkylene oxides, particularly ethylene and propylene oxides, while obtaining a filterable product which is essentially in native granule form. An alkaline catalyst is used to promote the etherification reaction. Such catalysts include inorganic alkalies, namely the alkali metal or alkaline earth metal hydroxides, and also organic bases, such as amines or quaternary ammonium compounds, including quaternary ammonium hydroxides, trialkyl amines and tri(hydroxyalkyl) amines. In commercial practice, the preferred alkaline catalyst has been sodium hydroxide because of its cheapness and efficiency.

The use of an alkaline catalyst tends to promote swelling or gelatinization of the starch, but with suitable temperature control and/or the presence of a swelling inhibitor, a useful degree of modification can be obtained without swelling the starch to a non-filterable state. Heretofore, the extent of the hydroxyalkyl substitution has been regarded as sharply limited if a filterable product is to be obtained. In etherifications with ethylene oxide or propylene oxide where the starch is suspended in water for the etherification reaction, the maximum practical level for obtaining filterable products has been accepted as not over 0.15 D.S., that is, 0.15 mole of ethylene oxide or propylene oxide reacted per anhydroglucose unit of the starch. In commercial practice, even lower degrees of substitution have been accepted to avoid difficulties in filtration and washing, most modifications being with ethylene oxide in the range of 0.05 to 0.1 D.S.

In the alkylene oxide monofunctional etherification of starch, it is known that the degree of swelling can be controlled to some extent by the use of an alkali metal salt as a swelling inhibitor. The most commonly used salt for this purpose is sodium chloride. As the degree of ether group substitution in starch is increased, the product becomes increasingly cold-water soluble. Consequently, for alkylene oxide modifications in the range of 0.10 to 0.15 D.S., it has been necessary to use a substantial concentration of the alkali metal salt in order to obtain filterable products. Such salts are objectionable in the final product and they will carry over into the product unless removed by filtration and washing. However, even though enough salt is present to prevent swelling during the etherification, as the level of etherification is increased up to about 0.15 D.S., the product becomes increasingly difficult to wash. In the first dewatering by filtration or centrifugation, the residual liquid will contain the salt in the same concentration. On further washing, as required to remove the salt more completely, the inhibiting effect of the salt is substantially lost as its concentration decreases. Therefore dewatering of the resuspended starch becomes increasingly difficult, the product tending to become sticky or gummy in the centrifuge or filter. It can therefore be seen that the art has been presented with a serious dilemma. While more highly etherified products might be produced by alkylene oxide etherification, the increased salt concentration required makes it impractical to produce final products of low salt concentration. For most commercial applications, it is desired to have the final product contain less than 2% salt, as measured by ash content, and preferably not over 1% salt.

Unswollen granule starch can be reacted with alkylene oxides in the presence of a limited amount of moisture, insufficient to swell the product, or in non starch-swelling liquids such as alcohols or ketones. By these processes granule starch ethers which swell instantly when placed in cold water are obtained. Generally, by these processes, the substitution of from 0.3 to 0.6 mole of ether group per anhydroglucose unit results in cold-water-swelling granules. U.S. Pat. 2,516,634 shows that corn starch becomes cold-water-swelling when reacted by the dry reaction process with 12–14% by weight of ethylene oxide or .44 to .52 mole of ethylene oxide per anhydroglucose unit. U.S. Pat. 2,845,417 shows that starch ethers in the ungelatinized granule form which gelatinize instantly in cold water can be prepared by reacting starch with 15% by weight of ethylene oxide or .55 mole or ethylene oxide per anhydroglucose unit. U.S. Pat. 3,135,739 shows that starch reacted with propylene oxide to form an ungelatinized ether containing .52 mole of hydroxypropyl group per anhydroglucose unit gelatinize instantly in cold water. Products prepared by the processes described in these patents show cold-water-swelling properties even at lower degrees of ether group substitution, such as 0.2–0.3 mole of hydroxyethyl per anhydroglucose unit. Because of their tendency to swell greatly in cold water, these products cannot be purified by simple washing of their filter cakes with water. Therefore, their purification is difficult and costly. Side reaction products (viz glycols) and salts can be removed only by repeated extractions with solvents such as alcohols or ketones or other water-miscible solvents mixed with a limited amount of water, insufficient to swell the starch granules. Due to the cost of solvents, recovery costs, and costs of special equipment and safe operation of solvent processes, such purified high-substituted starch granule ethers have not heretofore been considered economically feasible for the usual commercial applications.

It has been proposed to prepare high-substituted starch ethers by the use of very low proportions of alkali or latent alkaline catalysts. This can result in fairly low salt contamination when the product is neutralized. However, there is also considerable contamination with side reaction products of the etherifying reagents because the efficiency of reaction of etherifying agents with starch generally ranges from 50–75% or lower. Generally, the etherification of alkaline starch with alkylene oxides results in contamination of the starch with from 25 to 50% of the hydrolysis product of the reagent. For example, ethylene oxide forms ethylene glycol, while propylene oxide forms propylene glycol. Therefore, even if low salt is present due to the use of low proportions of alkali, there will still be considerable contamination by such side reaction products in such difficultly purifiable highly-substituted starch ether products.

Side reaction products, such as glycols, and salts have a very deleterious effect on the properties of high-substituted hydroxyalkyl starch ethers. In many uses the starch is applied as a film, size or coating. Salts and glycols have a considerable weakening effect on film strength. Salts also tend to crystallize when films are dried, causing cloudy, opaque, whitish appearance. Glycols also tend to make starch films more hygroscopic and sticky at high humidities. Adhesive strength and bonding strength is lowered by such contamination. Hydroxypropyl ethers of starch, which are considered safe for use as "Food Starch Modified" require purification to remove salts and side reaction products, such as propylene glycol. The propylene glycol contaminant, while not necessarily toxic or harmful, has a bitter taste which is not desirable in food products. It can be removed by extraction of the cold-water-swelling starch ether with water-miscible solvents mixed with water. This is a costly procedure, as indicated above, and the possibility of residual solvent in the food product must be considered. Such solvents tend to be adsorbed by the starch and resist removal on drying. There is, therefore, a need for a process of preparing and purifying medium and high-substituted hydroxypropyl starch ethers without the use of organic solvents. There is also a need for an economical process for preparation and purification of other high-substituted starch ethers, since present processes are not economically feasible. A process for preparing higher monofunctionally substituted ethers of starch which can be purified by washing with water on a filter or in centrifugal equipment would result in much greater economy and greatly improved product purity. Such products would also be much more suitable for use in foods.

SUMMARY

This invention is based on the discovery that unswollen and uninhibited granule starches can be reacted with alkylene oxide etherifying agents in certain water-alkali-salt systems to yield high reacted and substituted starch ethers, which are susceptible to purification by washing with water with little or no swelling of the starch. This affords a very convenient and economical process for producing high-substituted hydroxyalkyl granule starch ethers in a highly purified state. The process involves suspending starch in water containing sufficient alkali, such as NaOH or KOH, to promote the etherification reaction, and a concentration of an alkali metal sulfate sufficient to prevent swelling of the substituted reaction product by the alkaline water. The surprising discovery has been made that ungelatinized and uninhibited starches which have been etherified to a high degree with ethylene or propylene oxide in an alkali metal sulfate solution can be washed on a filter with little or no swelling, even though degrees of ether group substitution (measured as hydroxyalkyl content) are obtained at levels above that which heretofore has been found sufficient to make the starch cold-water swelling. The products are different than any heretofore known, since they require heat for gelatinization although having hydroxyalkyl contents which would have made prior art products cold-water-swelling, unless the products were inhibited by bifunctional cross-links between ether groups.

Corn starch in the native granule form having an ether group substitution as high as 10% hydroxyethyl or 0.4 mole per anhydroglucose unit and potato starch having as high as 24.5% hydroxyethyl or 1.2 mole per anhydroglucose unit have been prepared by the present process and the product has been sufficiently resistant to cold-water swelling to enable it to be washed on a filter to a high degree of purity, viz below 2% salt and preferably not over 1% salt on an ash basis, and also substantially free of glycol. The process is advantageous for obtaining a substitution level (measured as hydroxyalkyl content) within the range from 0.2 to 1.5 D.S. The products, when dried, are similar to normal commercial starches in their physical form, except that they are much more resistant to swelling and gelatinization than would be predicted based on measured D.S. Their grits disintegrate readily in water and when the temperature is raised their water suspensions gelatinize. However, their gelatinization properties are very different from those of starch ethers having equal or even lower monofunctional molar ether contents. Such prior art ethers of starch gelatinize or swell very suddenly in cold water and are usually difficult to disperse to a lump-free suspension because the rapid swelling of the surface of their grits produces a somewhat water-impervious barrier which retards further dispersion. The highly-substituted ethers produced by the present process have no tendency to lump when added to water at normal or low temperatures. They are also bland tasting and their films clear and glossy and non-hygroscopic, due to the absence of salts and side reaction products. The experimental evidence indicates that the process of this invention promotes polymerization of the alkylene oxides to form graft polymers of starch with chains of oxyalkyl groups, such as oxyethyl or oxypropyl groups.

DETAILED DESCRIPTION

The present process involves the use of an alkali metal sulfate solution as a medium for conducting hydroxyalkylation reactions of ungelatinized, uninhibited, native granule starch. The discovery has been made that alkali metal sulfates, such as sodium sulfate or potassium sulfate, not only inhibit the gelatinization of starches and starch ethers by aqueous alkali, as has been generally known for any neutral alkali metal salt, but simultaneously they promote a special, unique hydroxyalkylation reaction which has not heretofore been known. It is apparently this reaction which makes the new process feasible. With fairly high degrees of ether group substitution the swelling temperature of the starch is not lowered to the extent that it becomes unfilterable on washing and in some cases is lowered very little which enables purification to a very high degree by washing with cold water. This effect is very new and unique and is contrary to the teachings of prior art patents and the literature on starch derivatives. This fortunate discovery enables the preparation of very pure, highly reacted and substituted starch ethers in water systems and washing filters or centrifugals.

Starch in the ungelatinized, uninhibited, native granule form is suspended in water in the form of a slurry or suspension, generally ranging in concentration from 20–45% by weight, and preferably about 30%–40%. Strong alkali, preferably, sodium hydroxide, is incorporated in the suspension, care being taken to avoid local gelatinization or swelling of the starch by the alkali before it is distributed throughout the suspension. Other known alkaline catalysts can be used. A sufficient amount of an alkali metal sulfate, preferably sodium or potassium sulfate, to prevent swelling of the etherified starch reaction product is also incorporated in the suspension. The proportion used depends on the degree of etherification which is desired.

The alkylene oxide etherifying agent, which may include substituted alkylene oxides, is added and the suspension agitated in apparatus provided with means to remove the heat evolved by the exothermic etherification reaction. The etherifying reagent, for example, ethylene oxide or propylene oxide, may be added gradually, as fast as it is consumed by the reaction or it may be added periodically in several increments. It is generally desirable to avoid a large excess of unreacted etherifying agent at any time.

When the desired amount of the alkylene oxide etherifying reagent has reacted, the suspension is diluted with water, dewatered on a suction filter, and again diluted and dewatered until the purified product analyzes a low ash and a low hydrolyzed reagent content, preferably below 1% by weight of either.

Any normal commercial starch in the ungelatinized, uninhibited, native granule form may be used. Unmodified granule starches are preferred. Suitable starches include those from different varieties of plants such as corn, wheat, tapioca, potato, milo, waxy-maize, rice, and hybrids containing starch having different amylose to amylopectin ratios. Starches which have been modified with acids, oxidizing agents, or other chemicals and which still are in the cold-water-insoluble native granule form may also be used, providing such modified starches remain readily gelatinizable. Starches which have been reacted with crosslinking reagents and are inhibited with respect to gelatinization properties are therefore not suitable.

A simple test to show that the granule starch starting material is not substantially inhibited and is readily gelatinizable can be made as follows: Suspend one part by weight of the granule starch in twelve parts by weight water at a neutral pH. Heat at 95° C. under atmospheric pressure for 15 minutes. If the starch has dispersed to a gelatinized non-settling condition it is suitable for use in the process of this invention.

Sodium or potassium hydroxide are the preferred alkalis. However, other alkaline catalysts, such as tertiary amines or quaternary ammonium hydroxide, calcium hydroxide, or barium hydroxide can be used in special cases. Generally proportions of sodium hydroxide at any one time ranging from 0.3% to around 5% based on starch solids in the suspension are suitable. For hydroxyalkylations using ethylene oxide or propylene oxide from 0.5 to 2.5% NaOH based on starch solids in the suspension is preferred.

The success of the present process depends on the presence of soluble sulfates, preferably sodium or potassium sulfate. These are used in an amount equal on a molar basis to at least 3 to 5 parts by weight of sodium sulfate or its molar equivalent per 100 parts of water, depending on the degree of ether group substitution which is desired. For example, for hydroxyethylations ranging from 3% to 7% hydroxyethyl content the use of 5% to 10% by weight of $Na_2SO_4$ based on total water is preferred. For hydroxyethylations ranging from 7% to 10% hydroxyethyl content the use of 15% to 20% $Na_2SO_4$ based on the total water is preferred. For hydroxyethylations ranging from 10% to 25% hydroxyethyl content the use of 20% to 25% $Na_2SO_4$ based on total water is preferred. It has not generally been desirable to use more than 30% $Na_2SO_4$ or equivalent $K_2SO_4$ based on total water.

Fairly low reaction temperatures are advantageous. Temperatures below 80° F. may be used though reaction rates become slower as the temperature is lowered below this level. Temperatures approaching the swelling temperature of the etherified starch product are to be avoided to prevent swelling and also browning reactions of the starch due to the alkaline conditions and long reaction periods. In general, temperatures within the range from 70° F. to 120° F. are feasible, depending on the degree of etherification which is sought. The preferred reaction temperature range for ethylene and propylene oxides is 90° to 110° F.

When the desired proportion of etherifying agent has reacted the suspension can be neutralized with acid and dewatered by filtration or centrifugation to form a cake. By resuspending the cake in cold water and again dewatering the salts and side reaction products can be greatly reduced. By repeated resuspension in cold water and subsequent dewatering the majority of the salts and side reaction products (e.g. glycols) can be removed and ash contents below 1% are possible for many products of the process of this invention. In some cases, for example, hydroxyethyl ethers of unmodified potato starch prepared by the present process, the products can be purified by normal filter cake washing even with hydroxyethyl groups contents up to 25%. Generally, however, it is preferable to wash the product by dilution and dewatering rather than by adding water to the surface of the filter cake. Generally, starch ether prepared by the present process and analyzing up to 0.4 mole of combined ether groups per anhydroglucose unit can be purified by this method to have ash contents of less than 2.0% and still be in the substantially unswollen, native granule form. When dried, these products are white and somewhat gritty but they disperse readily in water without lumping or persistence of the grit or pearl form to produce smooth suspensions which can be readily gelatinized to form perfectly smooth, lump-free pastes. As the ether group substitution obtained by the present process is raised to around 0.65 mole of alkylene oxide per anhydroglucose unit the product can be dewatered and resuspended fewer times without causing serious granule swelling as the protective salt is removed. Generally, products in this range of ether group substitution can be purified to contain from 1% to 5% ash and still remain in the substantially unswollen, native granule form. Similar high degrees of ether group substitution can be attained by the present process when using commercial starches such as corn, wheat, tapioca, waxy-maize, milo and high amylose corn starch.

When unmodified potato starch is reacted with ethylene oxide by the present process, very high hydroxyethyl content is obtained by analysis, yet the starch remains readily washable with 70–80° F. water without significant swelling, even though the sodium sulfate content is reduced to a trace amount. Potato starch having a combined hydroxyethyl content of 24.5% or 1.2 mole of hydroxyethyl per anhydroglucose unit prepared by the present process was found to be readily filterable and washable. It was washed with water to a non-gritty, white, native granule state to an ash content of 0.25%.

The high reacted or high substituted starch ethers of this invention have a number of improved and new properties not possessed by underivatized native starches. Many of these new properties are very useful in specific applications where starch is used in industrial processes and consumer uses, including foods.

One outstanding property of the highly reacted starch ethers, for example, 4% to 10% hydroxyethyl or hydroxypropyl content, is the very greatly increased resistance to freeze-thaw effects as compared with underivatized commercial starches and low-substituted ether derivatives. When normal starch pastes are subjected to slow freezing and thawing or repeated freezing and thawing, their pastes undergo syneresis, become spongy and insoluble, and lose their smooth, cohesive texture. Highly substituted starch ethers form pastes which are practically unchanged on repeated freezing and thawing. An edible starch ether, for example, highly substituted, purified hydroxypropyl starch prepared by the present process, is therefore ideally suited for use as thickeners and stabilizers in frozen foods such as frozen soups, gravies, fillings, etc. The resistance of highly substituted starch ethers to paste deterioration on freezing and thawing is of value of other applications where freezing or near freezing temperatures may be encountered, for example, poster pastes, adhesives, and liquid laundry starches.

Another outstanding property of the high reacted starch ethers as compared with underivatized or low-substituted starches is their paste stability or resistance to set-back on aging. Underivatized or low-substituted starch ethers form pastes which tend to become retrograded or associated on aging, especially when held in high concentrations. Thus, when formulated in such applications as adhesives, pastes, sizes, etc., they cause the formulation to become viscous and even solid on aging. Highly-substituted starch ethers are ideally suited for applications which require resistance to this "set-back." This property of resistance to set-back is retained when highly-substituted starch ethers are converted to thin-boiling starches, oxidatively depolymerized starches, and even dextrins. Formulations containing these conversion products are greatly superior to those containing ordinary dextrins or converted starches.

Another property of the highly-reacted starch ethers is their resistance to bacterial decomposition of their pastes. Highly-substituted starch hydroxyethyl ethers (prepared by other processes) have been used commercially as textile warp sizes to minimize pollution when the desized starch is discarded into rivers. Such starch has a much lower five-day biochemical oxygen demand (B.O.D.) than underivatized starch and helps prevent oxygen depletion and resultant danger to fish and beneficial organisms in the river.

High-substituted starch ethers, such as hydroxyethyl, hydroxypropyl, and hydroxybutyl starches have thermoplastic properties and tend to fuse and flow when heated and highly compressed. When formulated with suitable plasticizers their films can be used for portion packaging and have heat sealing properties.

Highly-substituted starch ethers and their films tend to burn readily due to their higher hydrocarbon ratio and burn with a fairly smokeless, non-sooty flame. This property is useful in applications where starch size is removed by burning, for example, in the flame desizing of starch-sized fiber glass. Low-ash, highly substituted starch ethers produced by the present process are especially suitable.

As will be seen from the foregoing discussion, the maximum reaction or degree of substitution measured as hydroxyalkyl content will vary with the particular starch, the particular alkylene oxide being used for the etherification, concentration of the alkali metal sulfate, and other reaction conditions. In general, however, the process of the present invention can advantageously be employed for preparing products having a substitution level, measured as hydroxyalkyl, within the range from 0.2 to 1.5 D.S. at which the granule starch is filterable and washable. For the modification of uninhibited corn starch while maintaining it in its native granule form, a preferred embodiment of the process, which results in novel products, involves termination of the etherification reaction at a measured D.S. within the range from 0.22 to 0.44 mole of alkylene oxide reacted per mole of starch. With the reaction of uninhibited potato starch, novel products are obtained in a preferred embodiment where the reaction is terminated at a measured D.S. within the range from 0.3 to 1.3 moles of alkylene oxide reacted per mole of starch. The products of these preferred embodiments are obtained by employing from 5 to 30 parts by weight of sodium sulfate (or molar equivalent of potassium sulfate) per 100 parts of water in the starch suspension. The products are produced in a filterable and washable form. They are dewatered by filtration or centrifugation, and then washed, preferably by resuspending in water, and again dewatering, to reduce the salt content thereof. The salt content is measured by "ash" and can range from 0.5 to 5%, but is preferably less than 2% by weight. Commercial products produced as described in this application can advantageously contain less than 1% by weight of salt measured on a total ash basis. When the salts are reduced to these low levels, the side reaction glycol (ethylene or propylene glycol) is also substantially removed, thereby achieving not only salt-free but glycol-free products.

This invention is further illustrated by the following specific examples; but it will be understood that the invention is not limited thereby.

Example 1

Unmodified corn starch was made up into a suspension having a starch to water ratio of 30:70 and containing 5 parts by weight of $Na_2SO_4$ per 100 parts by weight of water and 1.5 parts by weight of NaOH per 100 parts by weight of starch solids. The salt and alkali were added together slowly with agitation sufficient to give uniform distribution without local swelling of the starch at the point of addition. Five parts by weight of ethylene oxide per 100 parts of starch solids were added and the suspension agitated in a closed vessel at a constant 100° F. temperature for 24 hours. This was repeated with another 5 parts by weight of ethylene oxide for another 24 hours. The suspension was then neutralized with acid, diluted to around 20% starch concentration and dewatered in a suction filter. The filter cake was resuspended in about 20% starch solids concentration and dewatered 2 more times. The filter cake was similar to that of normal starch and was not soft and sticky. The dried filter cake was non-gritty and dispersed readily in water. The dried starch contained 0.19% ash and analyzed 6.3% by weight of hydroxyethyl by the analytical method given in Anal. Chem. 28: 892 (1956), which shows that 0.24 mole of the ethylene oxide reacted per mole of starch. The gelatinization temperature range of the product was determined by slowly raising the temperature of a 5% suspension of the product and placing a drop of the suspension in an Abbé Refractometer at intervals and reading the Brix scale. The temperature at which a Brix reading is first obtained and the temperature at which a 5% reading is obtained was considered to be the gelatinization temperature range of the starch.

Example 2

Unmodified corn starch was made up into a suspension having a starch to water ratio of 30:70 and containing 20 parts by weight of $NaSO_4$ per 100 parts by weight of water and 1.5 parts by weight of NaOH per 100 parts by weight of starch solids. The salt and alkali were added together slowly with agitation sufficient to give uniform distribution without local swelling of the starch at the point of addition. Fifteen parts by weight of ethylene oxide per 100 parts by weight of starch were added in third portions at 24 hour intervals and the suspension was agitated in a closed vessel at a constant temperature of 100° F. After 72 hours the suspension was neutralized with acid, diluted to about 20% starch concentration with cold water, and dewatered on a suction filter. The filter cake was resuspended in cold water in about a 20% starch concentration and dewatered 2 more times. The filter cake was similar to that of normal starch and was not soft and sticky. The dried filter cake was non-gritty and dispersed readily in water without lumping. The dried starch product analyzed 1.25% ash and 9.9% by weight of hydroxyethyl, which corresponds with a D.S. of 0.4. The product had a gelatinization temperature range of 112°–119° F. by the test described in Example 1.

Example 3

Unmodified corn starch reacted under the conditions described in Example 2 except that 15 parts by weight of propylene oxide per 100 parts by weight of starch instead of ethylene oxide and a total reaction time of 72 hours were used. The product analyzed 11.35% by weight of hydroxypropyl and 1.34% ash, which corresponds with a D.S. of 0.355. The dried product dispersed readily in water without lumping and gelatinized in the temperature range of 110–115° F. by the test described in Example 1.

Example 4

Unmodified tapioca starch was reacted under the conditions described in Example 3 except that 10 parts by weight of ethylene oxide and a total reaction time of 48 hours was used. The neutralized product was dewatered, resuspended and washed three times. The dried starch product was white, non-gritty and analyzed 6.6% by weight of hydroxyethyl (0.254 D.S.) and .025% ash. It dispersed readily in water and gelatinized in a temperature range of 115–120° F. by the test given in Example 1.

Example 5

Example 4 was repeated using unmodified waxy maize starch instead of tapioca starch. The dried product was white and non-gritty and analyzed 6.6% by weight of hydroxyethyl (0.254 D.S.) and .022% ash. It dispersed readily in water and gelatinized in a temperature range of 130–135° F.

Example 6

Example 5 was repeated except that unmodified high amylose starch (Trademarked "Amylomaize" and containing around 55% amylose) was used instead of tapioca starch. The dried product was white, non-gritty, and analyzed 6.17% hydroxyethyl (0.235 D.S.) and 0.10% ash. It dispersed readily in water and gelatinized in a temperature range of 165°–180° F. by the test described in Example 1. This high amylose starch before the above treatment required pressure cooking at the temperature above 212° F. to gelatinize.

Example 7

Unmodified potato starch was made up into a suspension having a starch to water ratio of 35:65 and containing 10 parts by weight of $Na_2SO_4$ per 100 parts by weight of starch solids. The salt and alkali were added together slowly with agitation sufficient to give uniform distribution without local swelling of the starch at the point of addition. Fifteen parts by weight of ethylene oxide per 100 parts by weight of starch were added in third portions at 24 hours intervals and the supension was agitated in a closed vessel at a constant temperature of 100° F. After 72 hours the suspension was neutralized with acid, diluted to a 20% starch concentration with water, dewatered and washed. The filter cake was resuspended, dewatered and washed 2 more times, and dried. The filter cake dried to a non-gritty, white powder which analyzed 11% by weight of hydroxyethyl (0.446 D.S.) and 0.24% ash. The product dispersed readily in water and gelatinized in a temperature range of 137–140° F. by the test given in Example 1.

Example 8

The procedure of Example 7 was followed except that the unmodified potato starch was reacted with a total proportion of 50 parts by weight of ethylene oxide per 100 parts by weight of starch, using 5 parts by weight increments every 24 hours. The air-dried product was a non-gritty white powder which analyzed 24.5% hydroxyethyl content (1.19 D.S.) and 0.28% ash. The product dispersed readily in water and showed birefringent crosses under polarized light in 70–80° water. As the temperature of the water was raised, the crosses gradually disappeared but not entirely until 130–135° F. was reached.

Example 9

Example 1 was repeated except that 5 parts by weight of $K_2SO_4$ was used instead of 5 parts by weight of $Na_2SO_4$. The dried product was white, non-gritty, and analyzed 6.18% hydroxyethyl (0.237 D.S.) and 0.07% ash. It dispersed readily in water and gelatinized in a temperature range of 125–130° F. by the test given in Example 1.

Example 10

Example 1 was repeated except that 5 parts by weight of $K_2SO_4$ was used instead of 5 parts by weight of $Na_2SO_4$ and 2.2 parts by weight of KOH was used instead of 1.5 parts by weight of NaOH. The dried product was white, non-gritty, and analyzed 6.21% hydroxyethyl (0.238 D.S.) and 0.09% ash. It dispersed readily in water and gelatinized in a temperature range of 120–130° F. by the test given in Example 1.

Example 11

Example 3 was repeated to the stage just prior to dewatering and purification. To the suspension was added concentrated HCl solution containing 2 parts by weight of HCl per 100 parts by weight of water in the suspension. The acid-conversion was conducted for 30 hours at 110° F. and the suspension was then neutralized to a pH of 4.5 with $Na_2CO_3$ solution, diluted to about 20% starch concentration with cold water and dewatered on a suction filter. The filter cake was resuspended in about a 20% starch concentration and dewatered 2 more times. The dried filter cake was white and somewhat gritty and analyzed 8.32% hydroxyethyl and 1.03% ash and had a paste viscosity of a medium fluidity thin-boil starch. It dispersed readily in water and gelatinized within a temperature range of 115–120° F. by the test given in Example 1.

Example 12

For purposes of comparison, unmodified corn starch was made up into four suspensions having starch-to-water ratios of 30:70 and containing 1.5 parts by weight of NaOH per 100 parts by weight of starch solids and 5.5 parts, 11 parts, 22 parts, and 25 parts by weight of sodium chloride per 100 parts by weight of water in the suspension. The sodium chloride was in lieu of the sodium sulfate as used in the process of this invention. The alkali and salt were added with agitation sufficient to prevent localized swelling of the starch before the alkali was distributed. Ten parts by weight of ethylene oxide per 100 parts by weight of starch solids were then added and the suspension agitated in a closed vessel at 100° F. for 24 hours. Each suspension was very fluid and the starches were unswollen at this point. Another ten parts by weight of ethylene oxide were added and the reactions continued at 100° F. Within 24 hours all of the suspensions and set up to a solid condition. Examination of the starches showed that all had swelled. When attempts were made to suspend the product in cold water and dewater and wash on a filter, all of the starches swelled to a sticky state which clogged the filter and prevented further washing.

These results show that sodium chloride is an effective swelling inhibitor only when low proportions of ethylene oxide are reacted with starch. When high proportions such as 10% or more are reacted, the starch swells and becomes unfilterable on washing even though high concentrations of sodium chloride are used. This shows that sodium chloride is not suitable for the process of the present invention, and is not the equivalent of sodium or potassium sulfate.

Although the full explanation is not known, the process of this invention appears to be unique and to result in the production of unique etherified products. The evidence indicates that there is a novel and heretofore unrecognized effect of alkali metal sulfates on the mechanism of starch hydroxyalkylations with alkylene oxides. Existing knowledge does not account for the unusual results obtained. In general, the products require temperatures above 100° F. for gelatinization in neutral water suspensions. It is not known why the etherified starch granules produced by the method of this invention do not swell in cold or room temperature water at the high hydroxyalkyl contents. They do disperse readily without lumping in water below the gelatinization temperature. The evidence strongly indicates that the distribution of the hydroxyethyl or hydroxypropyl groups in the granule is different from that in previously known granule starch ethers, and that this determines the different swelling properties in cold water. More specifically, it appears that the present process promotes a polymerization of the oxyethyl or oxypropyl units in chains which are grafted to the starch molecule with an ether linkage, and, therefore, is not washed out on purification. The substituted starch containing the graft polymers would analyze similar to a starch ether which had only hydroxypropyl or hydroxyethyl groups, while providing starch ethers with a range of chain lengths in the ether groups, containing hydroxyethyl or hydroxypropyl groups, as well as oxyethyl or oxypropyl polymers of varying chain lengths. The products of this invention are therefore more properly describable as high hydroxyalkyl content starches, or starches containing high ethylene oxide or propylene oxide content expressed as hydroxyethyl or hydroxypropyl. Such compounds can therefore be represented by the type formulas:

(1)  Starch—O—(CH$_2$CH$_2$O)$_x$H (2)  Starch—O—(oxypropyl)$_y$H

Formula 1 designates starch containing ether-substituted polyoxyethyl chains terminating in hydroxyl; and Formula 2 designates starch containing ether-substituted polyoxypropyl groups terminating in hydroxyl. The letters $x$ and $y$ are integers of 1 or greater.

As used herein, the term "uninhibited" refers to starch which is substantially free of cross-linked ether groups, and is therefore substantially as readily gelatinizable as the same starch in its native unmodified granule form.

I claim:

1. The process of preparing substantially non-cold-water-swelling reaction products from a substantially uninhibited readily gelatinizable granule starch, having high levels of an alkylene oxide, said products being substituted to 0.2 D.S. and above and being substantially free of salt and glycol, consisting:
   (a) forming a water suspension of the said uninhibited gelatinizable granule starch containing an alkaline etherification catalyst and having dissolved in the water of said suspension a sulfate salt of an alkali metal selected from the group consisting of sodium sulfate and potassium sulfate in an amount equal on a molar basis to 5 to 30 parts by weight of sodium sulfate per each 100 parts of said water;
   (b) subjecting said granule starch to an etherification reaction in said alkali metal sulfate containing suspension with at least 0.2 mole of an alkylene oxide per anhydroglucose unit, said alkylene oxide being selected from the group consisting of ethylene oxide and propylene oxide and said reaction being continued to and terminated at a substitution level measured as hydroxyalkyl content within the range from 0.2 to 1.5 D.S. at which said granule starch is filterable and washable; and
   (c) dewatering and washing with water the resulting granule starch reaction product containing salt and a glycol side reaction product to reduce the salt and glycol content thereof, said dewatering and washing being continued until the washed starch product has an ash content of less than 2% by weight.

2. The process of claim 1 characterized by the further fact that said starch is corn starch and said reaction is terminated at a substitution level measured as hydroxyalkyl content within the range from 0.22 to 0.44 D.S.

3. The process of claim 2 characterized by the further fact that said alkylene oxide is ethylene oxide.

4. The process of claim 3 characterized by the further fact that said alkylene oxide is propylene oxide.

5. The process of claim 1 characterized by the further fact that said starch is potato starch and said reaction is terminated at a substitution level measured as hydroxyalkyl content within the range from 0.3 to 1.3 D.S.

6. The process of claim 5 characterized by the further fact that said alkylene oxide is ethylene oxide.

7. The process of claim 5 characterized by the further fact that said alkylene oxide is propylene oxide.

8. The process of preparing substantially non-cold-water-swelling reaction products from a substantially unmodified granule starch, using high levels of an alkylene oxide, said products being substituted to 0.3 D.S. and above and being substantially free of salt and glycol, consisting:
   (a) forming a water suspension of the said unmodified granule starch containing an alkaline etherification catalyst to promote the etherification reaction and having dissolved in the water of said suspension sodium sulfate in an amount of 5 to 30 parts by weight of sodium sulfate per each 100 parts of said water;
   (b) subjecting said granule starch to an etherification reaction in said sodium sulfate containing suspension with at least 0.3 mole of an alkylene oxide per anhydroglucose unit, said alkylene oxide being selected from the group consisting of ethylene oxide and propylene oxide and said reaction being continued to and terminated at a substitution level measured as hydroxyalkyl content within the range from 0.3 to 1.3 D.S. at which said granule starch is filterable and washable; and
   (c) dewatering and washing with water the resulting granule starch reaction product containing sodium sulfate and a glycol side reaction product to reduce the sodium sulfate and glycol content thereof, said dewatering and washing being continued until the washed starch product has an ash content of less than 1% by weight.

9. The process of claim 8 characterized by the further fact that said starch is corn starch.

10. The process of claim 8 characterized by the further fact that said starch is potato starch.

11. The process of claim 8 characterized by the further fact that said starch is waxy-maize starch.

12. The process of claim 8 characterized by the further fact that said starch is tapioca starch.

13. The process of claim 8 characterized by the further fact that said starch is high amylose starch.

14. The process of preparing substantially non-cold-water-swelling reaction products of a substantially uninhibited readily gelatinizable granule starch, using high levels of an alkylene oxide, said granule starch starting material dispersing to a gelatinized non-settling condition when a suspension of 1 part thereof per 12 parts water by weight is heated at 95° C. for 15 minutes, said products being substituted to 0.2 D.S. and above and being substantially free of salt and glycol, consisting:
   (a) forming a water suspension of said uninhibited granule starch starting material, said suspension containing an alkaline etherification catalyst and having dissolved in the water of said suspension a sulfate salt of an alkali metal selected from the group consisting of sodium sulfate and potassium sulfate in an amount equal on a molar basis to 5 to 30 parts by weight of sodium sulfate per each 100 parts of said water;
   (b) subjecting said granule starch to an etherification reaction in said alkali metal sulfate containing suspension with at least 0.2 mole of an alkylene oxide per anhydroglucose unit, said alkylene oxide being selected from the group consisting of ethylene oxide and propylene oxide and said reaction being continued to and terminated at a substitution level measured as hydroxyalkyl content within the range from 0.2 to 1.5 D.S. at which said granule starch is filterable and washable; and
   (c) dewatering and washing with water the resulting granule starch reaction product containing salt and a glycol side reaction product to reduce the salt and glycol content thereof, said dewatering and washing being continued until the washed starch product has an ash content of less than 2% by weight.

15. The process of claim 14 characterized by the further fact that said starch is corn starch and said reaction is terminated at a substitution level measured as hydroxyalkyl content within the range from 0.22 to 0.44 D.S.

16. The process of claim 15 characterized by the further fact that said alkylene oxide is ethylene oxide.

17. The process of claim 15 characterized by the further fact that said alkylene oxide is propylene oxide.

18. The process of claim 14 characterized by the further fact that said starch is potato starch and said reaction is terminated at a substitution level measured as hydroxyalkyl content within the range from 0.3 to 1.3 D.S.

19. The process of claim 18 characterized by the further fact that said alkylene oxide is ethylene oxide.

20. The process of claim 18 characterized by the further fact that said alkylene oxide is propylene oxide.

21. The granule starch products produced by the process of claim 15 and being further characterized by containing less than 1% ash by weight and by requiring a temperature of at least 100° F. for gelatinization in neutral water suspensions thereof while being dispersible in granule form in water below their gelatinization temperature, said starch products being substanially free of cross-linked ether groups.

22. The granule starch products produced by the process of claim 19, and being further characterized by containing less than 1% ash by weight and requiring a temperature of at least 100° F. for gelatinization in neutral water suspensions thereof while being dispersible in granule form below their gelatinzation temperatures, said starch products being substantially free of cross-linked ether groups.

References Cited

UNITED STATES PATENTS

| | | | |
|---|---|---|---|
| 3,577,407 | 5/1971 | Hjermstad | 260—233.3 |
| 3,378,546 | 4/1968 | Tsuzuki | 260—233.3 |
| 3,014,901 | 12/1961 | Gill et al. | 260—233.3 |
| 2,845,417 | 7/1958 | Kesler et al. | 260—233.3 |
| 2,733,238 | 1/1956 | Kerr et al. | 260—233.3 |

OTHER REFERENCES

Whistler: Methods in Carbohydrate Chemistry, vol. 4, pp. 304–306, 1964, Academic Press.

DONALD E. CZAJA, Primary Examiner

M. I. MARQUIS, Assistant Examiner

U.S. Cl. X.R.

260—9R, 233.5